(12) United States Patent
Kirubaharan

(10) Patent No.: US 8,286,777 B2
(45) Date of Patent: Oct. 16, 2012

(54) ADJUSTMENT FITTING FOR USE IN A MOTOR VEHICLE COMPONENT

(75) Inventor: Reginold Albert Kirubaharan, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 561 days.

(21) Appl. No.: 12/528,976

(22) PCT Filed: Feb. 22, 2008

(86) PCT No.: PCT/EP2008/001426
§ 371 (c)(1), (2), (4) Date: Aug. 27, 2009

(87) PCT Pub. No.: WO2008/104334
PCT Pub. Date: Sep. 4, 2008

(65) Prior Publication Data
US 2010/0056317 A1 Mar. 4, 2010

(30) Foreign Application Priority Data
Feb. 28, 2007 (DE) .......................... 10 2007 010 078

(51) Int. Cl.
*B60N 2/225* (2006.01)
*F16H 1/32* (2006.01)
(52) U.S. Cl. ....................... 192/223.1; 475/175; 297/362
(58) Field of Classification Search .................. 192/223, 192/223.1; 475/162, 175; 297/362
See application file for complete search history.

(56) References Cited

U.S. PATENT DOCUMENTS

| 5,871,414 | A | 2/1999 | Voss et al. | |
|---|---|---|---|---|
| 7,090,298 | B2 * | 8/2006 | Lange | 297/362 |
| 7,243,994 | B2 * | 7/2007 | Cha | 297/362 |
| 7,285,067 | B2 * | 10/2007 | Krambeck et al. | 475/162 |
| 7,513,573 | B2 * | 4/2009 | Wahls et al. | 297/362 |
| 2006/0290187 | A1 * | 12/2006 | Scholz et al. | 297/362 |

FOREIGN PATENT DOCUMENTS

| DE | 19548809 C1 | 5/1997 |
|---|---|---|
| DE | 102004039538 A1 | 3/2006 |
| DE | 102005028779 B4 | 7/2007 |

OTHER PUBLICATIONS

Patent Cooperation Treaty, International Search Report, PCT/EP2008/001426, Jun. 11, 2007.

* cited by examiner

*Primary Examiner* — Richard M. Lorence
(74) *Attorney, Agent, or Firm* — Butzel Long

(57) ABSTRACT

An adjustment fitting (10) for a motor vehicle component, particularly a vehicle seat, is proposed, the adjustment fitting having a first fitting part (1) and a second fitting part (2) that is rotatably adjustable about a rotary axis (30) relative to the first fitting part by means of a gear drive, the gear drive (3) comprising a first gearing (31) on the first fitting part (1) and the gear drive (3) comprising a second gearing (32) arranged eccentrically to the first gearing (31). Two wedge segments (33, 34) are provided for securing the eccentric arrangement of the first gearing (31) relative to the second gearing (32), the wedge segments being mounted radially outward in a sliding bushing (43) having bushing gear teeth (42). The adjustment fitting (10) has a braking element (40), the braking element (40) in a release position being arranged inside the radius of the sliding bushing (43), and the braking element (40) engaging the bushing gear teeth (42) in a locked position.

7 Claims, 4 Drawing Sheets

ADJUSTMENT FITTING FOR USE IN A MOTOR VEHICLE COMPONENT

CROSS REFERENCE TO RELATED APPLICATIONS

The present application is a U.S. National Stage filing of International Application No. PCT/EP2008/001426, filed on Feb. 22, 2008, titled "Adjustment fitting for a motor vehicle component and method for securing the latching of an adjustment fitting" which claims priority to German Patent Application No. DE 10 2007 010 078.9, filed Feb. 28, 2007, the entire disclosures of which are incorporated herein by reference.

BACKGROUND

The present disclosure generally relates to an adjustment fitting for use in a motor vehicle component, particularly for use in a vehicle seat having a first fitting part and a second fitting part provided to be rotatably adjustable about a rotary axis relative to the first fitting part by means of a gear drive, the gear drive comprising a first gearing on the first fitting part and the gear drive comprising a second gearing on the second fitting part arranged eccentrically to the first gearing, and having two wedge segments for selectively operating the adjustment fitting.

Adjustment fittings are generally known. For example, an adjustment and fixing device for seats, such as motor vehicle seats, for adjusting the backrest relative to the seat part, is known from the German printed patent specification DE 195 48 809 C1, published May 22, 1997, to Voss et al. In this case, for preventing the deflection of the fitting part connected to the backrest, under dynamic operating conditions and over a time period characterized by vibrations and impacts, a stop ring is arranged in the radial plane between the wedge segments and the driver, the stop ring having at least one stop lug on an external periphery which may engage in the counter gearing of the fixed fitting part. It has been found in such a device, that backlash which causes releasing of the stop lug is present and a continuous engagement of the stop lug in the counter gearing of the fixed fitting part is present which results, on the one hand, in undesired noise generation and, on the other hand, in additional force expenditure for adjusting the fitting.

SUMMARY

In one exemplary embodiment, there is disclosed an adjustment fitting for a motor vehicle component, particularly a vehicle seat, the adjustment fitting having a first fitting part and a second fitting part, the second fitting part being provided to be rotatably adjustable about a rotary axis relative to the first fitting part by means of a gear drive, the adjustment fitting, on the one hand, being relatively smooth-running and having low noise generation, being able to be produced easily and thus cost-effectively and also being oriented against deflection.

In one exemplary embodiment, there is disclosed an adjustment fitting having a first fitting part and a second fitting part, the second fitting part being provided to be rotatably adjustable about a rotary axis relative to the first fitting part by a gear drive, the gear drive having a first gearing on the first fitting part and the gear drive having a second gearing on the second fitting part arranged eccentrically to the first gearing, two wedge segments being provided for securing the eccentric arrangement of the first gearing relative to the second gearing, the wedge segments being mounted radially outward in a sliding bushing having bushing gear teeth. Further in the one embodiment, the adjustment fitting includes a braking element, the braking element being able to be set alternately in a release position or in a locked position, the braking element in the release position being arranged inside the radius of the sliding bushing and the braking element engaging the bushing gear teeth in the locked position. As a result, the braking element may be designed to be particularly structurally compact and small, so that the adjustment fitting as a whole may be produced in a very structurally compact manner and thus more cost effectively. Further, in the one embodiment the bushing gear teeth are provided as a gearing connected to the sliding bushing. It is, however, alternatively also possible that the bushing gear teeth are provided as a gearing separate from the sliding bushing. However, in this case bushing gear teeth are referred to below.

According to one exemplary embodiment of the adjustment fitting, it is further preferably provided that the braking element includes a locking element, in the locked position the locking element being provided engaging in the bushing gear teeth radially to the rotary axis. As a result, it is advantageously possible that, without impairing the function of the gearings, a locking of the fitting parts relative to one another is possible by means of the braking element in a simple and cost-effective manner.

In one exemplary embodiment it is further preferably provided that the locking element and the bushing gear teeth are provided such that a number of locked positions are predetermined, the number of locked positions being smaller than the number of teeth, both of the first gearing and of the second gearing. This has the advantage that the locking element—in otherwise the same conditions, such as the use of the same material of the locking element, etc.—may be designed to be relatively large and able to be subjected to relatively larger loads.

In one exemplary embodiment, it is further preferred that the braking element has a spring element, the spring element setting the braking element in the release position. As a result, it is possible that during normal operation of the adjustment fitting, no additional friction and no noise occurs as a result of the braking element.

In one exemplary embodiment the braking element has a closed partial element, the braking element being provided to be tiltable relative to the closed partial element. As a result, it is particularly advantageously possible that the braking element is moved in a simple and yet secure manner and thus fulfills its function.

In one exemplary embodiment, it is provided in an adjustment fitting that the closed partial element encloses a drive shaft of the adjustment fitting. As a result, the operation of the braking element may be improved in a simple manner. Alternatively, the closed partial element may also be configured such that the drive shaft is not entirely enclosed; however a closed partial element is referred to below.

In one exemplary embodiment there is disclosed a method for securing the latching of an adjustment fitting for use in a latching a motor vehicle component, particularly for use in latching a vehicle seat, the adjustment fitting having a first fitting part and a second fitting part provided to be rotatably adjustable about a rotary axis relative to the first fitting part by a gear drive, the gear drive comprising a first gearing on the first fitting part and the gear drive comprising a second gearing on the second fitting part arranged eccentrically to the first gearing, two wedge segments being provided for securing the eccentric arrangement of the first gearing relative to the second gearing, and a braking element being provided, the braking element being tilted relative to the closed partial element when set in its locked position.

Details of the disclosed exemplary embodiments are shown in the drawings and described in more detail in the following detailed description.

DETAILED DESCRIPTION

Figure 1:
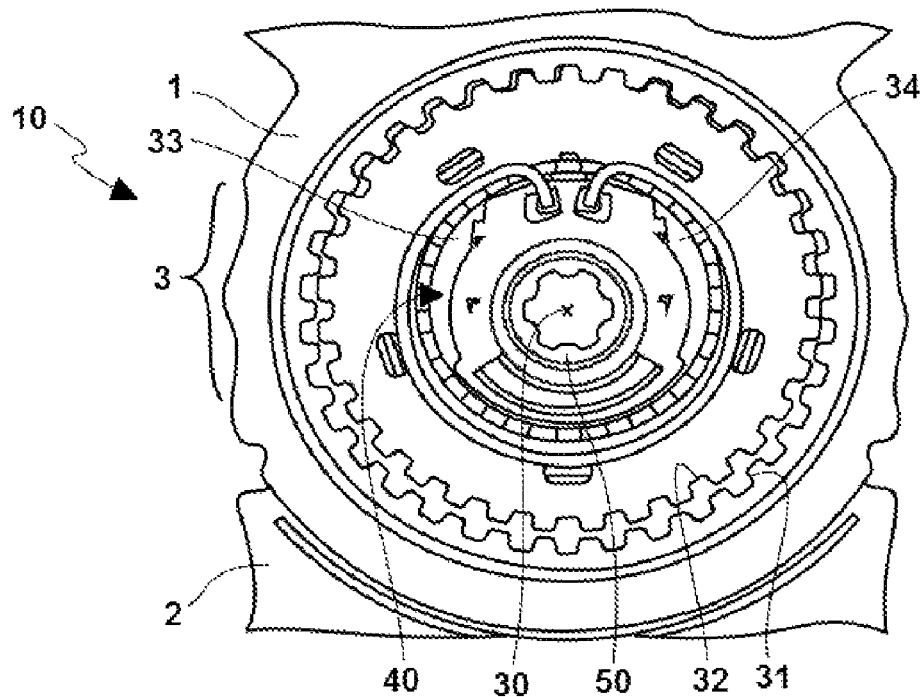
FIGS. 1 and 2 disclose in two views of different scale an adjustment fitting according to the invention in assembled form.
Figure 2:
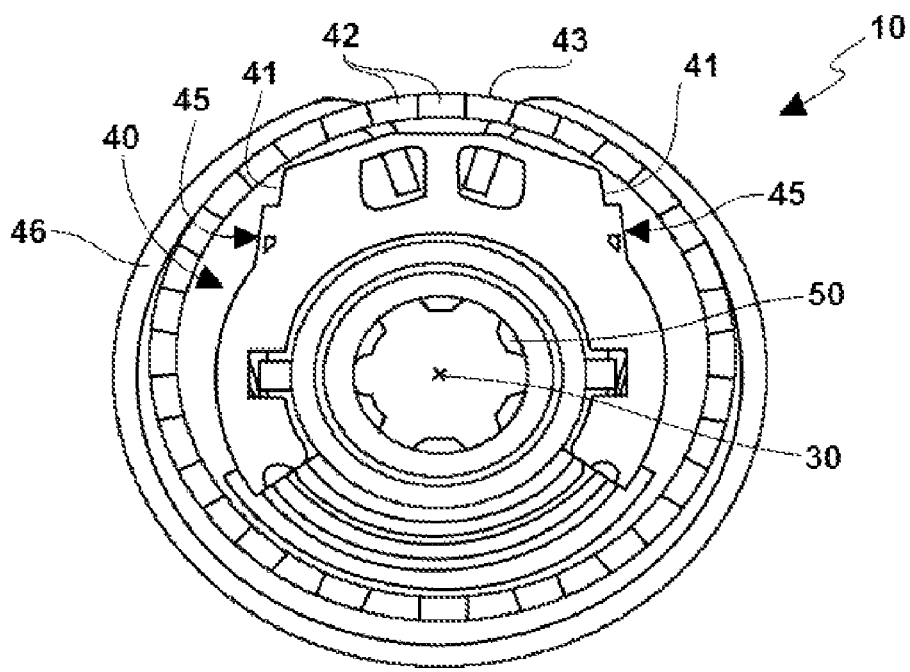

Referring to FIGS. 1-7, an adjustment fitting 10 according to one exemplary embodiment is shown in two views of different scale. The adjustment fitting 10 connects a first fitting part 1 to a second fitting part 2 as best shown in FIG. 1. The fitting parts 1 and 2 are provided rotatably adjustable relative to one another by rotating a drive element 50 about a rotary axis 30, in particular with a large gear ratio of between, for example, about 1:20 to 1:50, and more preferably a gear ratio n of about 1:30 to 1:40. As a result, it is possible that the adjustment fitting 10 may be used for connecting different parts of a motor vehicle component which are provided rotationally movable relative to one another and preferably may be steplessly adjusted. Such a motor vehicle component 20 is shown schematically in the left-hand part of FIG. 1 in the example of a motor vehicle seat 20. Such a seat 20 and/or such a motor vehicle component 20, for example, has a backrest part 21 and a seat part 22, which are provided connected to one another in a rotatably adjustable manner via the adjustment fitting 10 according to this disclosure.

Rotational adjustability is ensured inside the adjustment fitting 10 by a gear drive 3, the gear drive 3 includes a first gearing 31 on the first fitting part 1 and a second gearing 32 on the second fitting part 2, and moreover a first wedge element 33 and a second wedge element 34 as shown in FIG. 1. In the disclosed exemplary embodiment, the gear drive 3 is configured to be self-locking by means of a frictional connection and is particularly preferably configured as a so-called wobble mechanism. However, with repeated force impacts occurring over a lengthy time period between the fitting parts 1, 2 (and/or when torques occur), it may arise that the first fitting part 1 is deflected relative to the second fitting part 2, i.e. that a small but continuous adjustment of the fitting parts 1, 2 relative to one another occurring in the same direction arises over a lengthy period of time such that the position of the adjustment fitting 10 will change without actuation of the adjustment fitting 10. This is particularly critical when the adjustment fitting is a fitting on a motor vehicle seat and moments and/or forces are always applied against the backrest 21 in substantially the same direction, so that over time a displacement of the adjustment fitting occurs if no suitable counter measures are taken. In order to prevent such a displacement, a braking element 40 is provided.

It is visible in particular from FIG. 1 that the rotary axis 30 represents the center point and/or the center axis of the drive element 50. The second gearing 32 and thus the second fitting part 2 are arranged eccentrically to the center axis 30. This eccentricity is achieved by an eccentric portion as part of the gear drive 3 being arranged between the drive element 50 and the second fitting part 2 and/or the second gearing 32, which eccentric portion comprises the first wedge element 33 and/or the first wedge segment 33 and the second wedge element 34 and/or the second wedge segment 34. The wedge segments 33, 34 are forced apart by a spring 46 as best shown in FIG. 1 and in FIG. 2 (and/or any other further spring element) on their broad opposing sides arranged in FIG. 1 in the upper, central region of the adjustment fitting Figure, such that the eccentricity of the second gearing 32 relative to the rotary axis 30 is at a maximum. This has the result that, at one point of the periphery of the second gearing 32, the second gearing 32 meshes with the first gearing 31. This is the case in the situation shown in FIG. 1 in the upper region of the second gearing 32 and/or also of the first gearing 31. The wedge segments 33, 34 are mounted outwardly and/or radially outwardly in a sliding bushing 43 which has a bushing gear teeth 42. A braking element 40 has a locking element 41 which may engage in the bushing gear teeth 42 and/or may cooperate with the bushing gear teeth 42 in the sense of a locking of the adjustment fitting 10.

Figure 3:
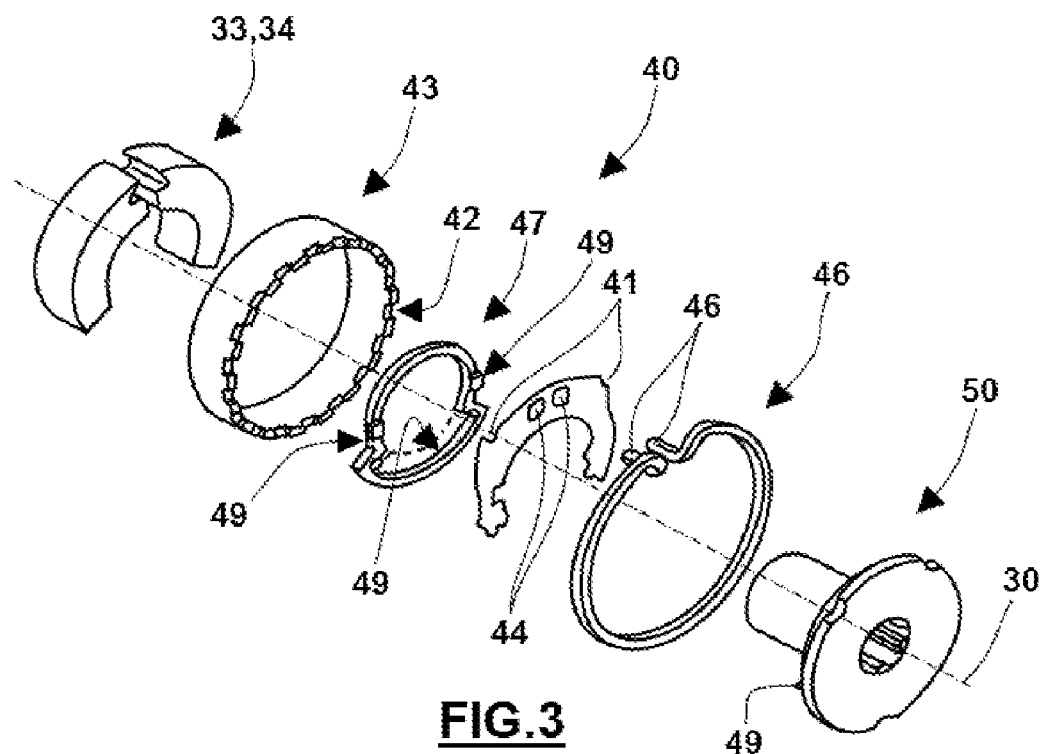
FIG. 3 shows an exploded view of a portion of the adjustment fitting.

An exploded view of the primary internal parts of the adjustment fitting 10 is shown in FIG. 3. A drive element 50 has a spline-shaped recess in its center. The rotary axis 30 extends through the drive element 50 (substantially coinciding with the axis of the exploded view in FIG. 3). The drive element 50 has a driver, not shown in the figures. By means of the driver the wedge segments 33, 34, when rotating the drive element 50 about the rotary axis 30, are moved in either rotational direction. As a result, the eccentric adjustment of the first gearing 31 relative to the second gearing 32 is reduced. At the same time, the braking element 40 is also rotated via the connection of the drive element 50 to the braking element 40 and/or to a closed partial element 47 of the braking element 40. The closed partial element 47 is, in this embodiment, fixedly connected as a separate part to the outer periphery of the drive element 50, in terms of rotation, via a positive connection element 49. The positive connection element 49 in the disclosed embodiment is only one example of being integrally connected to the drive element 50 but it not necessarily limited to such a type of connection. A projection 49' is arranged in the central region of the closed partial element 47, by way of example, such that the braking element 40 namely has a certain rotatability relative to the closed partial element 47, but in principle is also rotatably moved together with the drive element 50 and the closed partial element 47. The braking element 40 has on both sides a spring element 45 supported on the closed partial element 47, configured in the embodiment shown as leaf springs and/or in the manner of leaf springs. The braking element 40 further includes two recesses 44 (FIG. 3) for receiving ends 46' of spring element 46. The spring element 45 and the spring element 46 effect a tilting movement of the braking element 40. Moreover, the wedge elements 33, 34, the sliding bushing 43, the bushing gear teeth 42 and the locking element 41 are visible from the exploded view of FIG. 3.

Figure 4:
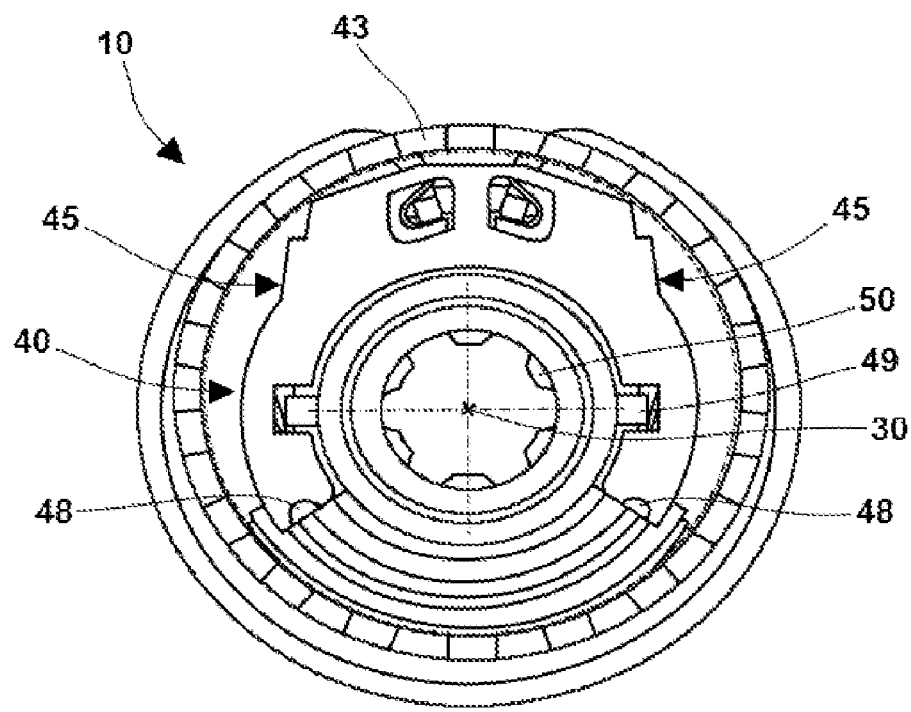
FIGS. 4 to 6 show different views of a braking element in different operating positions.
Figure 5:
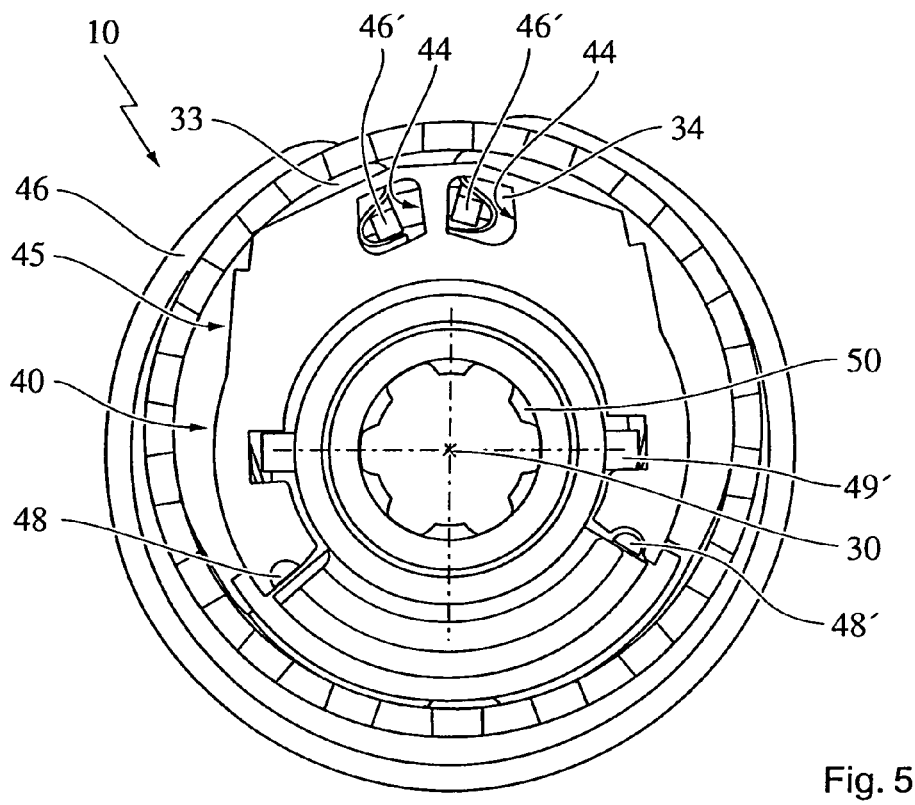
Figure 6:
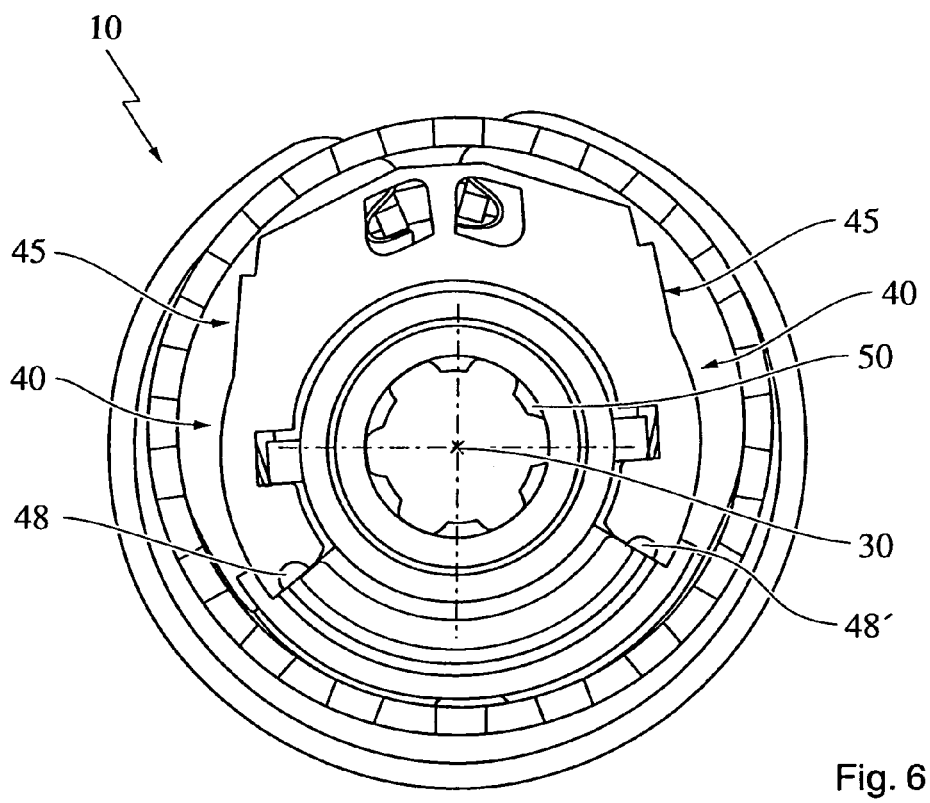
Figure 7:
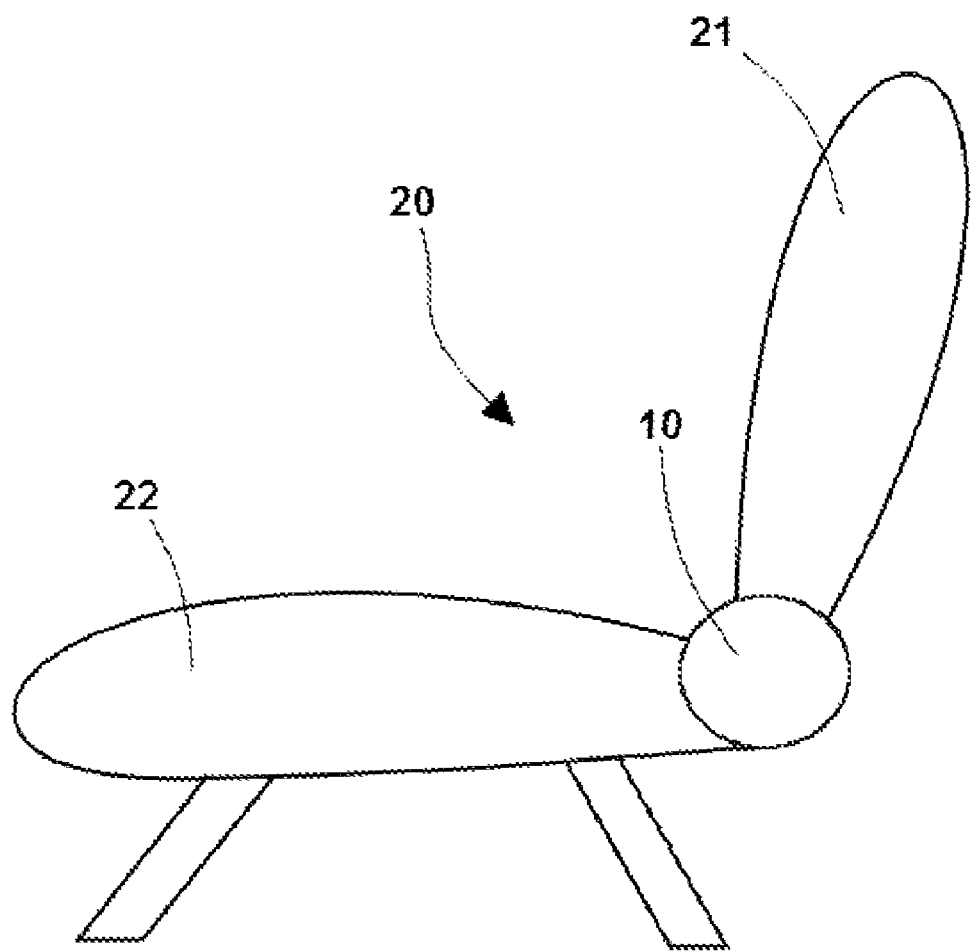
FIG. 7 shows a schematic view of a motor vehicle component.

The mode of operation of the adjustment fitting 10 is shown schematically hereinafter with reference to FIGS. 4 to 6. In FIG. 4, the braking element 40 is shown set in its release position. The braking element 40 is set in this release position due to the spring force of the spring element 45, such that it is entirely arranged inside the radius of the sliding bushing 43. This is shown in FIG. 4 by the dashed-dotted line, which extends along a slightly reduced radius relative to the internal radius of the sliding bushing 43 and along a slightly enlarged radius relative to the external radius of the braking element 40. As a result, reference is made to the fact that in the release position shown—i.e. both when setting and/or adjusting the adjustment fitting 10 and also during a fixed setting of the adjustment fitting 10 (due solely to the self-locking effect of the gear drive 3 and without activating the braking element 40)—a radial spacing and/or no contact is present between the braking element 40 and the sliding bushing 43. The exertion of a torque between the first and second fitting parts 1, 2 thus results in that the right-hand wedge element 34 is slightly moved (to the left as shown in FIG. 5) which results in that, by means of the further spring element 46 and/or by means of the left-hand wedge element 33, a displacement and/or a tilting of the braking element 40 takes place to the left about the left-hand tilted position denoted by the reference numeral 48. This tilting of the braking element 40 about the left-hand tilted position 48 (and/or about a right-hand tilted position 48' in the case of a movement of the left-hand wedge element 33 to the right) is effected, for example, by one of the ends 461 of the further spring element 46 being moved due to said movement of at least one of the wedge elements 33, 34 and in at least one partial region of this movement (from one of the ends 46' of the further spring element 46) this end 46' of the further spring element 46 in the region of a recess 44 of the braking element 40 is in contact with the braking element 40 and thus tilts the braking element 40. The transmission of the movement of the wedge elements 33, 34 to the braking element 40 may, also however be effected in a different manner than by penetration of the ends 46' of the further spring element 46 through recesses 44 of the braking element 40, for example by grooves and/or lugs and/or other positive connection elements between the wedge elements 33, 34 and the braking element 40. In the tilted setting, the braking element 40 is set in its locked position and locks the adjustment fitting 10 against a further deflection due to the externally applied torque. If in the situation and/or setting of the braking element 40 shown in FIG. 5, the drive element 50 is moved, it results again in a resetting of the braking element 40 into its normal position and/or into its release position. This takes place due to the spring action of the spring element 45 and due to a positive connection against a rotation between the closed partial element 47 of the braking element 40 and the drive element 50. This positive connection is implemented by means of a positive connection element 49 indicated by means of a dotted line as shown in FIG. 3 on the positive connection element 49, for example, being configured in the manner of an annular segment and being integrally connected to the drive element 50, which is shown in FIG. 3 by way of indication in the region of the drive element 50. In this case, for example, the positive connection element 49 engages in a correspondingly formed recess (see the dotted line in FIG. 3) in the region of the closed partial element 47. The release position of the braking element 40 is again shown in FIG. 6.

A rotation of the drive element 50 causes a wobble motion of the first fitting part 1 and thus of the first gearing 31 about the second fitting part 2 and/or the second gearing 32. The first gearing 31 has in this case at least one tooth more than the second gearing 32, so that it results in a rotational adjustment of the first fitting part 1 relative to the second fitting part 2. If the rotational movement about the rotary axis 30 of the drive element 50 is terminated, the braking element 40 is set in its release position. By forcing apart the wedge segments 33, 34 by means of the further spring element 46, a latching of the adjustment fitting 10 is achieved. Should this latching not be sufficient, in particular with variable loads and/or vibrations or jolting movements, a slight adjustment of the adjustment fitting 10 takes place so that the locking element 41 by rotation and/or tilting of the braking element 40 engages between two projections of the bushing gear teeth 42 and thus locking is achieved between the first and second fitting parts 1, 2. An additional deflection of the adjustment fitting 10 is thus no longer possible. According to the disclosed exemplary embodiment, this slight deflection of the adjustment fitting 10 is not noticeable for a user of the motor vehicle component 20, due to the relatively large gear ratio and preferably remains in the range below one degree (1°).

The invention claimed is:

1. An adjustment fitting (10) for use in a motor vehicle component (20), the adjustment fitting comprising:
a first fitting part (1);
a second fitting part (2), the first and second fitting parts being rotatably adjustable about a axis;
a gear drive (3) for moving the first and second fittings relative to each other, the gear drive (3) comprising a first gearing associated with the first fitting part and a second gearing associated with the second fitting part and arranged eccentrically to the first gearing, two wedge segments being provided for securing the eccentric arrangement of the first gearing relative to the second gearing, the wedge segments being mounted radially outward in a sliding bushing (43) having bushing gear teeth (42); and
a braking element (40) having a release position wherein the braking element is arranged inside a radius of the sliding bushing and the first and second fitting parts can be adjusted and a locked position wherein the braking element engages the bushing gear teeth and the first and second fitting parts cannot be adjusted.

2. The adjustment fitting of claim 1, wherein the braking element comprises a locking element and when the braking element is in the locked position the locking element engages the bushing gear teeth radially to the rotary axis.

3. The adjustment fitting of claim 2, wherein the locking element and the bushing gear teeth are provided such that a number of locked positions are predetermined, and the number of locked positions is fewer than the number of teeth of both the first gearing and of the second gearing.

4. The adjustment fitting of claim 2 wherein the braking element further includes a spring element for setting the braking element in the release position.

5. The adjustment fitting of claim 4 wherein the braking element includes a closed partial element and is tiltable relative to the closed partial element.

6. The adjustment fitting of claim 5 wherein the adjustment fitting further comprises a drive shaft and wherein the closed partial element is coupled to the drive shaft.

7. The adjustment fitting of claim 6 wherein the closed partial element is fixed in terms of rotation to the drive shaft of the adjustment fitting (10) by a positive connection element (49).

\* \* \* \* \*